(12) United States Patent
Joshi et al.

(10) Patent No.: US 12,335,153 B2
(45) Date of Patent: Jun. 17, 2025

(54) DYNAMIC QUALITY-OF-SERVICE (QOS) CONFIGURATION AND FORECASTING BASED ON WORKLOAD INTENT

(71) Applicant: Dell Products L.P., Round Rock, TX (US)

(72) Inventors: Abhidnya Joshi, Pune (IN); Omkar Ekbote, Pune (IN); Narendrapal Singh, Pune (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/179,906

(22) Filed: Mar. 7, 2023

(65) Prior Publication Data

US 2024/0305569 A1  Sep. 12, 2024

(51) Int. Cl.
*H04L 47/127* (2022.01)
*H04L 47/24* (2022.01)

(52) U.S. Cl.
CPC ............ *H04L 47/127* (2013.01); *H04L 47/24* (2013.01)

(58) Field of Classification Search
CPC ......... H04L 67/02; H04L 67/59; H04L 67/60; H04L 67/567; H04L 43/0864; H04L 63/029; H04L 63/0407; H04L 65/612; H04L 67/06; H04L 67/141; H04L 63/0272; H04L 12/189; H04L 69/40; H04L 9/40; H04L 63/0428; H04L 67/01; H04L 69/16; H04L 69/161; H04L 69/163; H04L 1/20; H04L 63/08; H04L 65/1101; H04L 65/4061; H04L 69/165; H04L 69/169; H04L 65/80; H04L 67/563; H04L 67/568; H04L 12/1836; H04L 65/403; H04L 67/56; H04L 1/00; H04L 61/59; H04L 63/145; H04L 63/1466; H04L 63/1483; H04L 63/168; H04L 47/805; H04L 47/20; H04L 47/24; H04L 47/10; H04L 47/822; H04L 67/535; H04L 67/10; H04L 67/62; H04L 67/289; H04L 67/306; H04L 67/566; H04L 41/147; H04L 67/55; H04L 67/5681; H04L 69/329; H04L 67/5682; H04L 41/0896; H04L 47/12; H04L 47/803; H04L 65/613; H04L 67/61; H04L 47/80; H04L 51/043;
(Continued)

(56) References Cited

U.S. PATENT DOCUMENTS

5,850,446 A * 12/1998 Berger ................ H04L 12/5692
713/153
9,591,084 B1 * 3/2017 Egorov ............... H04L 63/0807
(Continued)

*Primary Examiner* — Djenane M Bayard
(74) *Attorney, Agent, or Firm* — WOMBLE BOND DICKINSON (US) LLP (57) ABSTRACT

Systems and methods are disclosed that determine, by a client, a workload intent of a workload that is forthcoming from an application executing on the client. The workload intent corresponds to one or more characteristics of the workload over a connection between the client and a server. The systems and methods send, by the client to the server, a workload intent identifier corresponding to the workload intent. The server is configured to optimize server resources based on the workload intent identifier. The systems and methods send, by the client, one or more workload operations to the server over the connection that are consistent with the workload intent.

18 Claims, 8 Drawing Sheets

(58) Field of Classification Search
CPC ... H04L 65/1045; H04L 67/288; H04L 67/54;
H04L 61/4511; H04L 67/1001; H04L
67/1008; H04L 67/1097; H04L 67/303;
H04L 67/51; H04L 69/28; H04L 63/0807;
H04L 63/1425; H04L 67/1095; H04L
41/5009; H04L 41/5032; H04L 41/5067;
H04L 43/04; H04L 43/091; H04L 63/20;
H04L 67/04; H04L 67/2876; H04L 67/34;
H04L 67/5651

See application file for complete search history.

(56) References Cited

U.S. PATENT DOCUMENTS

| | | | |
|---|---|---|---|
| 2005/0132192 A1* | 6/2005 | Jeffries | H04L 9/3271 |
| | | | 713/169 |
| 2018/0241825 A1* | 8/2018 | Bolton | H04L 67/01 |
| 2019/0069195 A1* | 2/2019 | Makinen | H04W 28/0268 |
| 2021/0182108 A1* | 6/2021 | Eberlein | G06F 11/301 |
| 2022/0124009 A1* | 4/2022 | Metsch | G06Q 10/087 |

* cited by examiner

DYNAMIC QUALITY-OF-SERVICE (QOS) CONFIGURATION AND FORECASTING BASED ON WORKLOAD INTENT

FIELD OF THE PRESENT DISCLOSURE

Embodiments of the present disclosure relate generally to data storage systems. More particularly, embodiments of the present disclosure relate to dynamically configuration of quality-of-service (QOS) based on workload intent.

BACKGROUND

In conventional storage systems, clients send/receive data to/from backup servers using standard or proprietary file/block transfer protocols. The conventional storage systems use the transfer protocols for initial handshaking to establish a connection between the client and the server, and for data transfer over the established connection. The backup servers are configured to provide a particular quality-of-service (QOS) to each of its connected clients. Quality of service (QOS) is a measurement of the overall performance of a service. To quantitatively measure quality of service, several related aspects of the network service are often considered, such as packet loss, bit rate, throughput, transmission delay, availability, jitter, etc.

BRIEF DESCRIPTION OF THE DRAWINGS

Embodiments of the present disclosure are illustrated by way of example and not limitation in the figures of the accompanying drawings in which like references indicate similar elements.

DETAILED DESCRIPTION

Various embodiments and aspects of the present disclosures will be described with reference to details discussed below, and the accompanying drawings will illustrate the various embodiments. The following description and drawings are illustrative of the present disclosure and are not to be construed as limiting the present disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "some embodiments" or "an embodiment" means that a particular feature, structure, or characteristic described in conjunction with the embodiment can be included in at least some embodiments of the present disclosure. The appearances of the phrase "in some embodiments" in various places in the specification do not necessarily all refer to the same embodiment.

As discussed above, conventional backup/storage systems use the transfer protocols for initial handshaking to establish a connection between the client and the server, which provides initial target protocol level features/capabilities between the client and server. The handshaking process, however, does not enable the server to understand the "nature," or workload intent, of the workload (e.g., at a file protocol level) because the handshaking process does not share anything about the type of operations the client intends to perform for a forthcoming workload. As such, although many common commands will be unused by the client/server based on the characteristics of the data being generated or accessed by the client during the forthcoming workload, the server is still required to have all server resources (operations) available to support any workload request. For example, if the forthcoming workload is a backup workload that is write intensive, other operations such as browsing of shares/directories, random file access, and intensive locking are never used. As such, the server may be wasting some of its resources in indexing of files/prefetching/caching metadata, etc. In addition, in the absence of the client sharing a forthcoming workload's intent, a conventional storage system's underlying filesystem must either be tuned for general-purpose usage or must make attempts to "infer" workload characteristics by analyzing workload operations at runtime that are being received from the client. Many filesystems employ techniques, such as metadata caching, read-ahead & decompression caching etc. that target specific workloads. Due to resource constraints and to minimize time until the filesystem is ready to serve clients, decisions must be made to enable/disable these techniques at runtime. In conventional systems, these decisions are made entirely by the server without any cooperation from the client.

The present disclosure resolves the issues discussed above by providing an approach of a client sending a workload intent identifier to a server prior to sending workload operations so the server can optimize its server resources accordingly to effectively and efficiently process a forthcoming workload. As a result, the server reduces the amount of resources and improves the QoS to the client. The workload intent identifier corresponds to a workload intent of the forthcoming workload based on workload operations that the client will perform (i.e. RPC calls and their arguments). With this upfront knowledge, the server can optimize resources (per-client and per-connection) before the client begins operations. For example, for a particular connection, the server can configure, in real-time, faster metadata operations (ops) responses from a file system, allocate space in advance, delayed space allocation, faster indexing, etc. depending upon "the workload intent" of the workload. The client may also tune itself based on the workload intent. For example, if a connection is being opened for file restores, then upon the actual file open for a read, the client may start a greedy read ahead from the server so that applications can receive data much faster.

In some embodiments, the server tunes the storage system's filesystem and protocol server capabilities in real-time to provide dynamic quality-of-service on a shared storage system. In some embodiments, the server identifies a subset of protocol commands available between the client and the server to reduce unwanted traffic over the wire and optimize efficiency of client-server behavior based on the workload intent identifier.

In some embodiments, the server generates a forecast of an expected set of workload operations that the client will use and tunes the server and the filesystem for the forecasted workload operations. For example, the server may tune metadata cache for a filesystem tree under the current client's file handle for faster metadata operations. In some embodiments, the sever provides thick provisioning space for all files opened on the connection to reduce fragmentation in the filesystem for a workload that is forecasted to write large, contiguous files. In some embodiments, the server performs dynamic reservation of special types of streams in the filesystem based on workload categories, allowing more granular sizing of the storage system (e.g., X large sequential backup streams, X random I/O streams, X metadata and file verification streams, X generic streams etc.).

Figure 1:
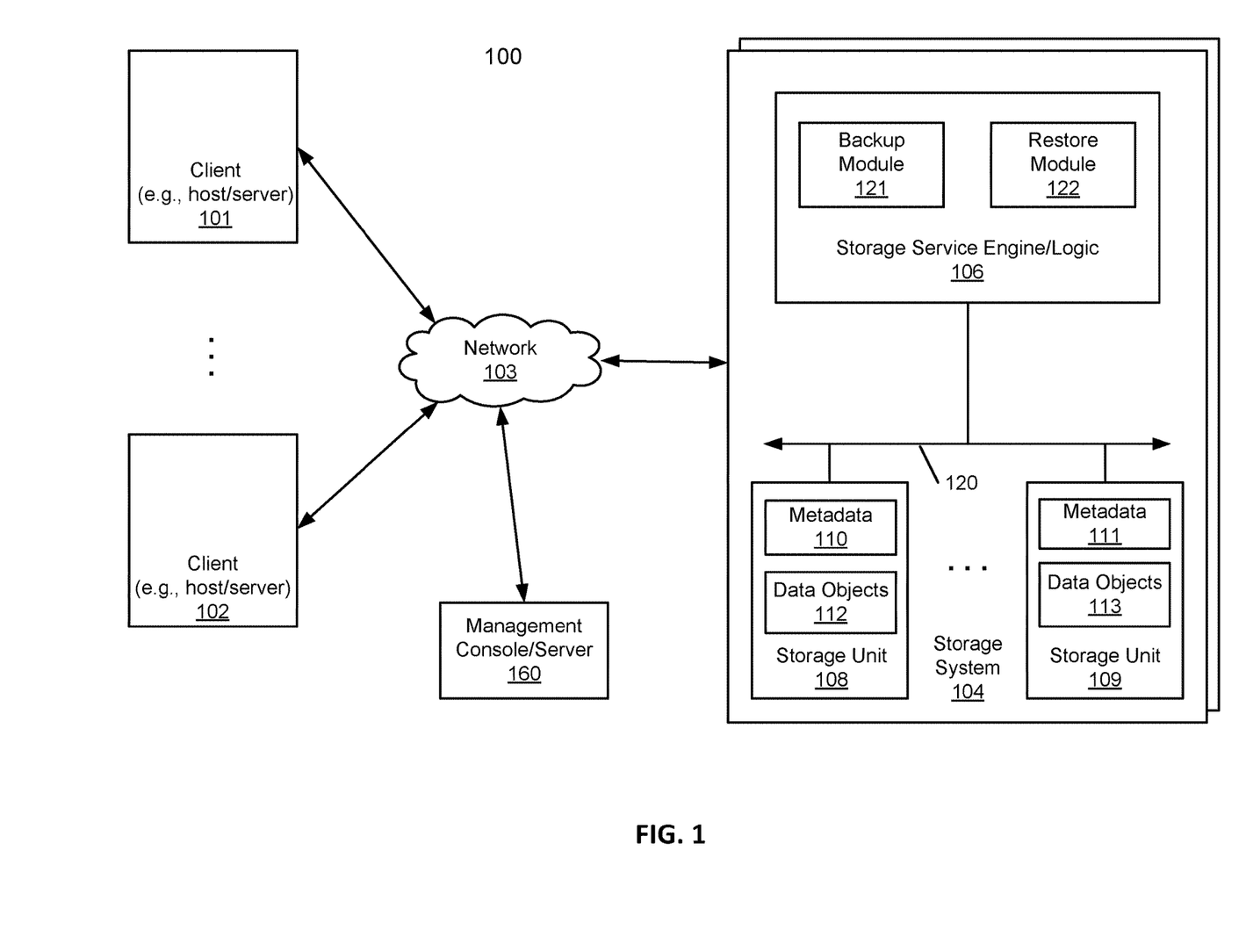
FIG. 1 is a block diagram illustrating a storage system according to some embodiments of the present disclosure.

FIG. 1 is a block diagram illustrating a storage system according to some embodiments of the present disclosure. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

File systems include one or more file system blocks. Some of the file system blocks are data blocks, some file system blocks may be indirect block, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system.

In some embodiments, storage system 104 includes, but is not limited to, storage service engine 106 (also referred to as service logic, service module, or service unit, which may be implemented in software, hardware, or a combination thereof), and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In some embodiments, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 2:
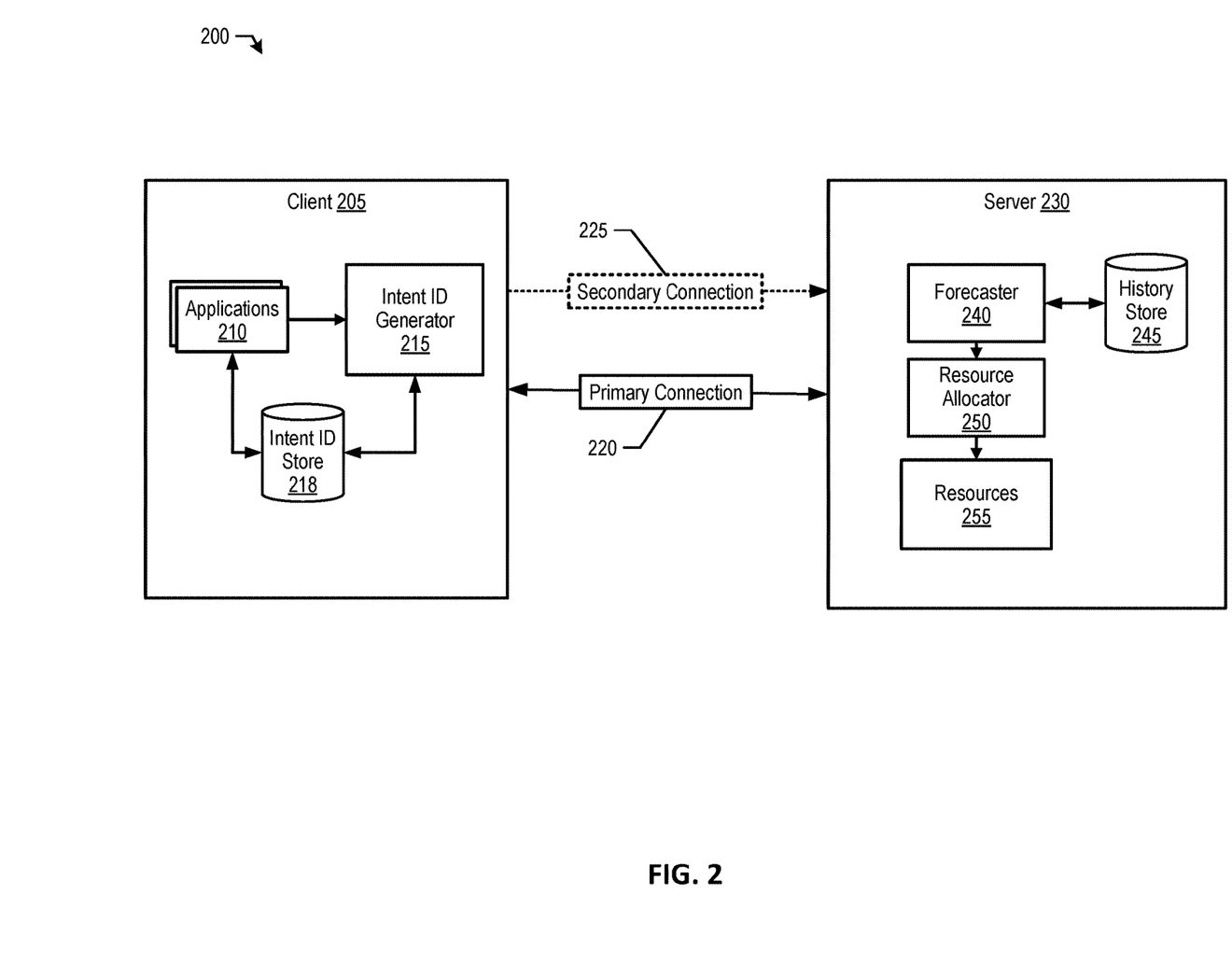
FIG. 2 is a block diagram illustrating a client sending a workload intent identifier to a server prior to sending workload operations so the server can optimize its server resources accordingly according to some embodiments of the present disclosure.

FIG. 2 is a block diagram illustrating a client sending a workload intent identifier to a server prior to sending workload operations so the server can optimize its server resources accordingly according to some embodiments of the present disclosure. As discussed herein, server 230 may obtain the workload intent identifier in-band via a customized protocol; out-of-band to augment standard protocols; or through an implicit derivation based on profiling client behavior over a range of time.

System 200 includes client 205 and server 230. Referring to FIG. 1, client 205 may be similar to clients 101 and 102, and server 230 may be similar to storage system 104. Applications 210 execute on client 205. While a general-purpose client (such as NFS/CIFS clients bundled with the operating system) may know or predict the operations a user is about to perform, an application 210 targeted to a purpose (such as data protection) for accessing a network file system may have enough information at the time of establishing a connection to define a workload intent based the characteristics of the workload that it is about to perform on the connection. In some embodiments, application 210 may provide a workload intent identifier to intent identifier generator 215 that indicates the workload intent such as:

WRITE_SMALL_FILES
WRITE LARGE_FILES
READ_FILE_SEQ
READ_LARGE_FILE_SEQUENCE
READ_LARGE_FILE_RANDOM
MULTI_STREAM_READ
WALK_DIR_TREE
ACCESS_FILE_METADATA
SPECIAL_OPS

Application 210 may also store a log entry in intent identifier store 218 that maps application 210 to a particular workload intent identifier. In some embodiments, when application 210 does not provide a workload intent identifier to intent identifier generator 215, intent identifier generator 215 accesses historical log entries from intent identifier store 218 to determine an appropriate workload intent identifier.

In some embodiments, a workload intent specification may include pre-defined bits corresponding to the workload intent identifiers above, and client 205/applications 210 are responsible for abiding by the pre-defined bits in the subsequent operations. In some embodiments, the workload intent specification is limited to one connection and can be re-established for another connection for a different workloads in the same manner.

In some embodiments, after intent identifier generator 215 obtains the workload intent identifier corresponding to the forthcoming workload, client 205 initiates initial handshaking with server 230 to establish primary connection 220, such as exchanging protocol version/dialect, capabilities, authentication, etc. (see FIGS. 3, 4, and corresponding text for further details. In some embodiments, primary connection 220 uses a proprietary protocol, which may be customized to include the workload intent identifier into the header (in-band). For example, when using a proprietary protocol where the application uses an SDK to communicate with the storage system over the network, flexibility exists to modify the proprietary protocol definition to include a new RPC during the initial handshake phase. The client uses this new RPC to explicitly specify the workload intent for the current connection with the storage system.

Figure 4:
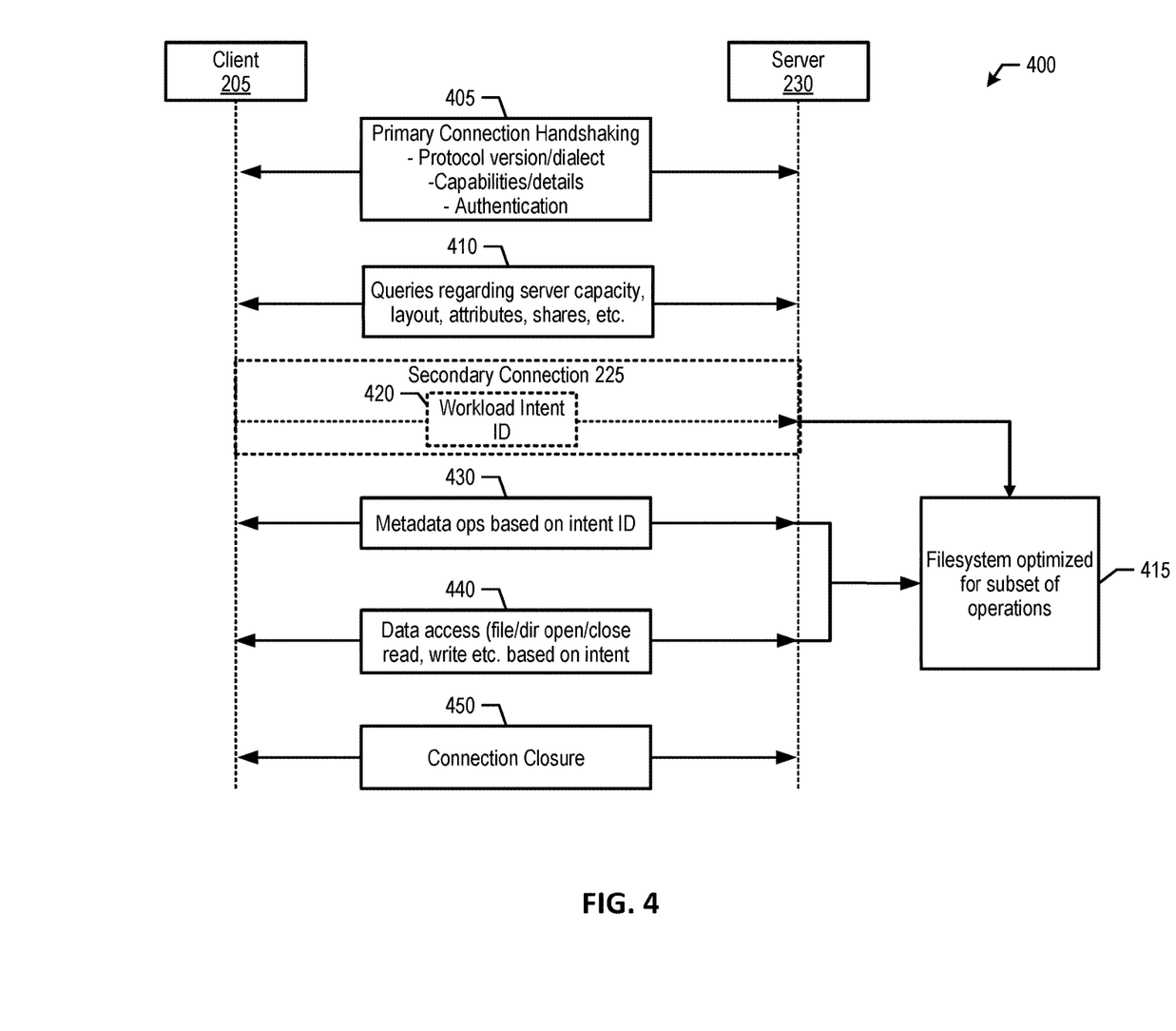
FIG. 4 is a block diagram illustrating a client sending the workload intent identifier to the server over a secondary connection according to some embodiments of the present disclosure.

In some embodiments, when primary connection 220 uses a standard protocol, client 205 initiates secondary connection 225 with server 230 (out-of-band) to send the workload intent identifier over secondary connection 225 to server 230 (see FIG. 4 and corresponding text for further details).

Server 230 uses forecaster 240 to match the workload intent identifier with a workload intent, and forecast a set of expected workload operations or expected protocol operations based on the workload intent. For example, forecaster 240 may access a lookup table in history store 245 to match the workload intent identifier with a workload intent and corresponding expected workload operations. Resource allocator 250 then optimizes server resources 255 based on the expected workload operations, such as supporting a subset of available workload operations, performing pre-workload operations, or a combination thereof. Server 230 then processes the workload using the optimized resources 255 as discussed herein. In some embodiments, system 200 may perform:

Server-side optimization: The workload intent with which client is going to connect helps in tuning server-side resources making strong QoS possible.

Network traffic reduction as a side effect: As client 205 issues commands based on the workload intent, network traffic will be reduced compared to regular generic communication scenarios.

Client behavior becomes dynamic (e.g. changing timeouts): Based on the forecast of the upcoming operations from client 205 to server 230, client 205 and server 230 can both adjust their timeouts/wait periods accordingly.

Cluster specific optimization: Knowing the workload intent and forecast of the operations from client 205, server 230 can distribute/redirect clients to specific nodes in order to optimize performance in a cluster deployment.

Large scale client collaboration: Server 230 can manage a substantial number of clients connecting to it in a better way knowing their workload intent and forecast.

Primary storage tuning: Primary storage can be tuned based on the workload intent or forecast where data fetching/dumping becomes faster.

Automatic backup window scheduling for data protection targets (balance client ingest to optimize network and local resource utilization)—postprocessing Anomaly detection by detecting malicious client activity against learned profile in real-time. Server 230 checks client 205's profile against the current time window. Maliciousness may be determined based on workload pattern, not well defined activities such as brute-force connections or delete ops.

Server 230 performs what-if analysis to determine whether to migrate workloads to a different protocol Server 230 performs what-if analysis for adding new workloads based on existing client profiles.

Server 230 performs real-time scaling to maintain QoS based on forecasted client workload.

In some embodiments, client 205 may not provide a workload intent identifier for a forthcoming workload over primary connection 220 or secondary connection 225. In these embodiments, server 230 may have profiled client 205 behavior and record the behavior in history store 245 under a persistent (long-term) unique client identifier (implicit derivation). This allows server 230 to recognize client 205 on each subsequent connection and predict what operations client 205 is expected to perform based on learned behaviors and external contexts (time of day, incoming network interface ID etc.). Once server 230 profiles multiple clients, server 230 now has a 'roster' of all clients' activities in a 24-hour (or 7-day) period, which can be fed to an analytics engine. In other words, server 230 learns about each client's workload intent and is able to forecast expected workload operations across multiple clients in each interval of time. For example, server 230 may generate data in history store 245 that includes information such as:

| Client ID | Time window | Workload Intent | Workload characteristics | Derived Intent |
|---|---|---|---|---|
| Client1 | Mondays, 10am-11am | Create new files Write data | Large files ~50 GB | WRITE_LARGE_FILES |
| Client2 | Saturdays, 1am | Walk dir tree Read files Checksum files | In/data/col1/mtree1 (created in last 7 days) Entire file | WALK_DIR_TREE ACCESS_FILE_METADATA READ_FILE_SEQ |
| Client3 | Wednesday, 12pm | Clone files | In/data/col1/mtree2, clone large files | SPECIAL_OPS |
| | | Read files | Read cloned files Random read | MULTI_STREAM_READ READ_LARGE_FILE_RAND |

Server 230 may then determine a workload intent identifier based on a client ID of client 205 and, for example, a current time of day.

Figure 3:
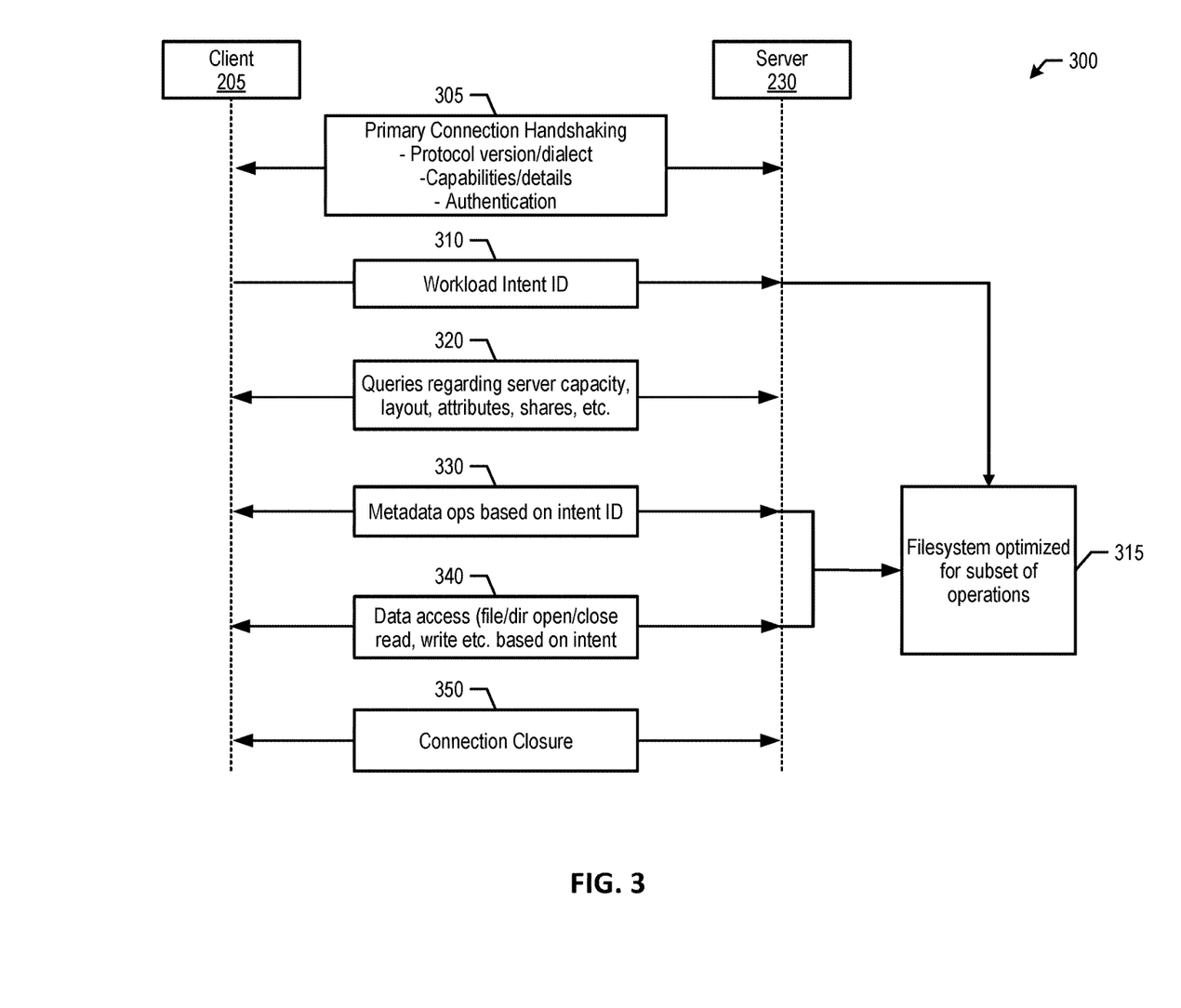
FIG. 3 is a block diagram illustrating a client sending the workload intent identifier to the server over a primary connection according to some embodiments of the present disclosure.

FIG. 3 is a block diagram illustrating a client sending the workload intent identifier to the server over a primary connection according to some embodiments of the present disclosure (in-band). Diagram 300 shows that client 205 and server 230 perform initial handshaking 305 to establish a primary connection, which includes exchanging information relating to protocol version, dialect, capabilities, authentication, etc. Client 205 then sends workload intent identifier 310 to server 230 over the primary connection, such as embedding the workload intent identifier into a customized protocol header.

Based on the workload intent identifier, the server can forecast a subset of workload operations (expected workload operations), typically defined as RPCs, that client 205 is expected to perform. Server 230 then optimizes the underlying filesystem to tune various settings or enable/disable optimization techniques suitable to the expected workload operations (315). Server 230 optimizes the filesystem on a per-client and per-connection basis such that the overall big picture of multiple clients connecting to the same shared storage server with different workload intents is balanced intelligently by server 230 to optimize resource utilization and provide a specific QoS to each client's satisfaction.

Client 205 and server 230 exchange queries regarding server capacity, layout, attributes, shares, etc. at 320. Client 205 then sends metadata operations based on the workload intent identifier at 330, and then performs the workload operations at 340. Server 230 uses the optimized server resources to support the workload operations. When the workload completes, the connection closes at 350.

FIG. 4 is a block diagram illustrating a client sending the workload intent identifier to the server over a secondary connection according to some embodiments of the present disclosure (out-of-band). Diagram 400 is similar to diagram 300 with the exception that diagram 400 shows a secondary connection being established between client 205 and server 230, which client 205 utilizes to send over the workload intent identifier to server 230.

Client 205 and server 230 perform primary connection handshaking 405, which includes exchanging information relating to protocol version, dialect, capabilities, authentication, etc. Client 205 and server 230 exchange queries regarding server capacity, layout, attributes, shares, etc. at 410.

When the primary connection uses standard network storage protocols such as NFS, CIFS etc. it is not possible to modify the protocol definition and add the workload intent identifier to the header since the header definition is bound to an RFC (request for comments) published by the IETF (Internet engineering task force). As such, when the primary connection uses a standard protocol, client 205 establishes a concurrent, secondary connection 225 to send over the workload intent identifier 420 to server 230. For example, during the connection establishment, client 205 can usually identify itself uniquely with an IP address and source port number used by the application or operating system to perform a network mount. Using this identifier, client 205 can use a different RPC mechanism (e.g., a REST API call) to send the workload intent identifier to server 230 before beginning I/O operations. The contents of this call are the same as above, with the addition of the unique client identifier.

Based on the workload intent identifier, the server can forecast a subset of workload operations (expected workload operations), typically defined as RPCs, that client 205 is expected to perform. Server 230 then optimizes the underlying filesystem to tune various settings or enable/disable optimization techniques suitable to the expected workload operations (415).

Client 205 then sends metadata operations based on the workload intent identifier at 430, and then performs the workload operations at 440. Server 230 uses the optimized server resources to support the workload operations. When the workload completes, the connection closes at 450.

Figure 5:
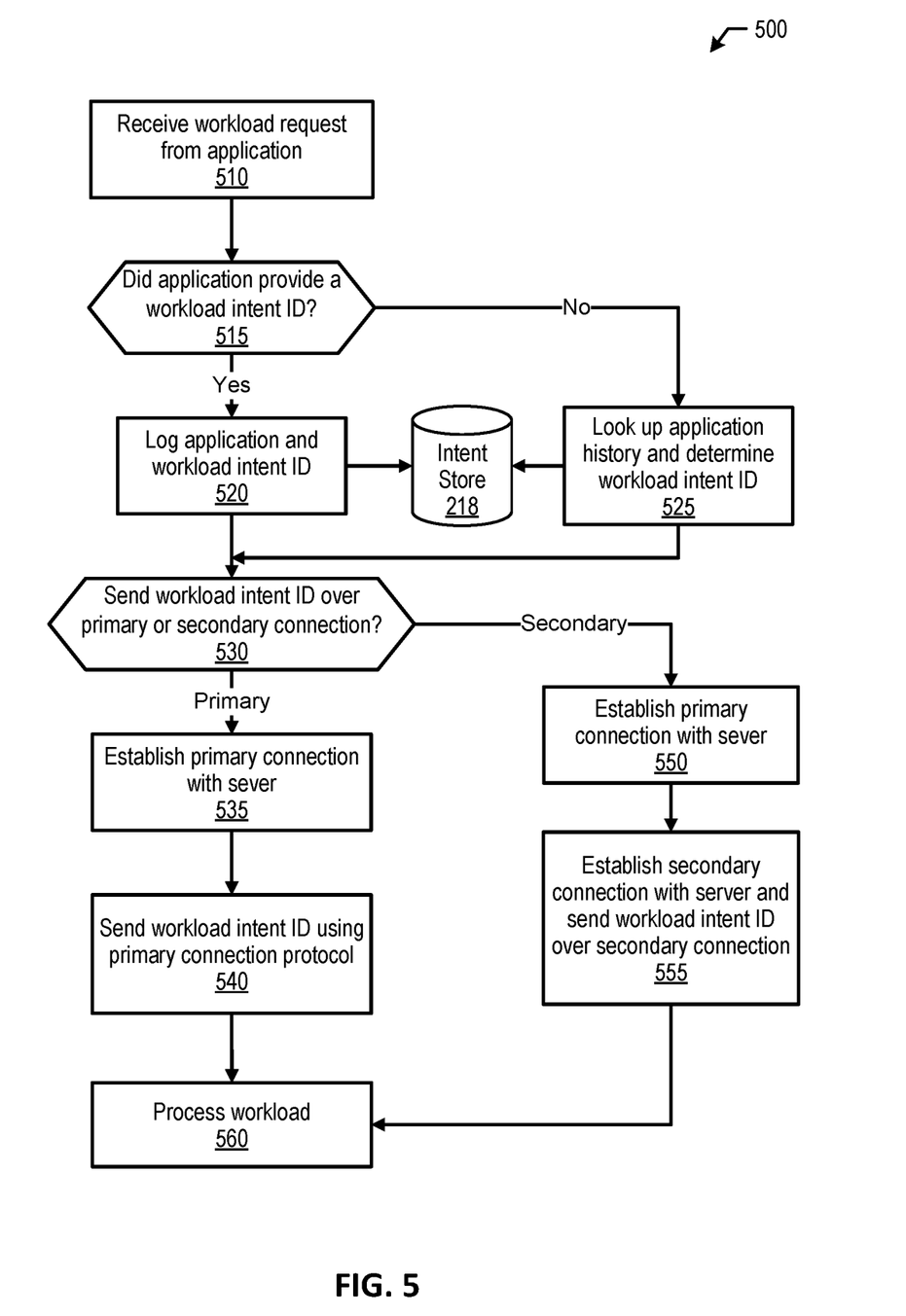
FIG. 5 is a flow diagram illustrating operations of a client determining a workload intent identifier corresponding to a forthcoming workload and sending the workload intent identifier to a server according to some embodiments of the present disclosure.

FIG. 5 is a flow diagram illustrating operations of a client determining a workload intent identifier corresponding to a forthcoming workload and sending the workload intent identifier to a server according to some embodiments of the present disclosure. Process 500 may be performed by processing logic that includes hardware (e.g. circuitry, dedicated logic, etc.), software (e.g., embodied on a non-transitory computer readable medium), or a combination thereof. For example, process 500 may be performed by client 101 of FIG. 1.

Referring to FIG. 5, process 500 illustrates example functions used by various embodiments. Although specific function blocks ("blocks") are disclosed in process 500, such blocks are examples. That is, embodiments are well suited to performing various other blocks or variations of the blocks recited in process 500. It is appreciated that the blocks in process 500 may be performed in an order different than presented, and that not all of the blocks in process 500 may be performed.

With reference to FIGS. 5, at block 510, processing logic receives a workload request from application 210. At block

515, processing logic determines whether application 210 provided a workload intent identifier for a forthcoming workload. If application 210 provided a workload intent identifier, block 515 branches to block 520, whereupon processing logic logs an identifier of the application and workload intent identifier in intent identifier store 218. On the other hand, if application 210 did not provide a workload intent identifier, block 515 branches to block 525, whereupon processing logic looks up previous workload history of application 210 in intent identifier store 218 and determines a workload intent identifier at block 525.

At block 530, processing logic determines whether to send the workload intent identifier over a primary connection or a secondary connection. For example, if the connection between the client and the server uses a custom protocol, the custom protocol may be configured to insert the workload intent identifier into the protocol header. However, if the network protocol used in the connection is a standard protocol, the client and server will establish a secondary connection, such as a REST API, for the client to send the workload intent identifier over to the server through the secondary connection.

If the client should send the workload intent identifier over the primary connection, block 530 branches to block 535, whereupon the client establishes a primary connection with the server and sends the workload intent identifier to the server over the primary connection at block 540. However, if the client should send the workload intent identifier over a secondary connection, block 530 branches to block 550, whereupon the client establishes a primary connection with the server, and then establishes a secondary connection with the server and sends the workload intent identifier over the secondary connection at block 555. At block 560, the client processes the workload by sending workload operations over to the server, which utilizes optimized resources based on the workload intent identifier to process the workload operations (see FIG. 6 and corresponding text for further details).

Figure 6:
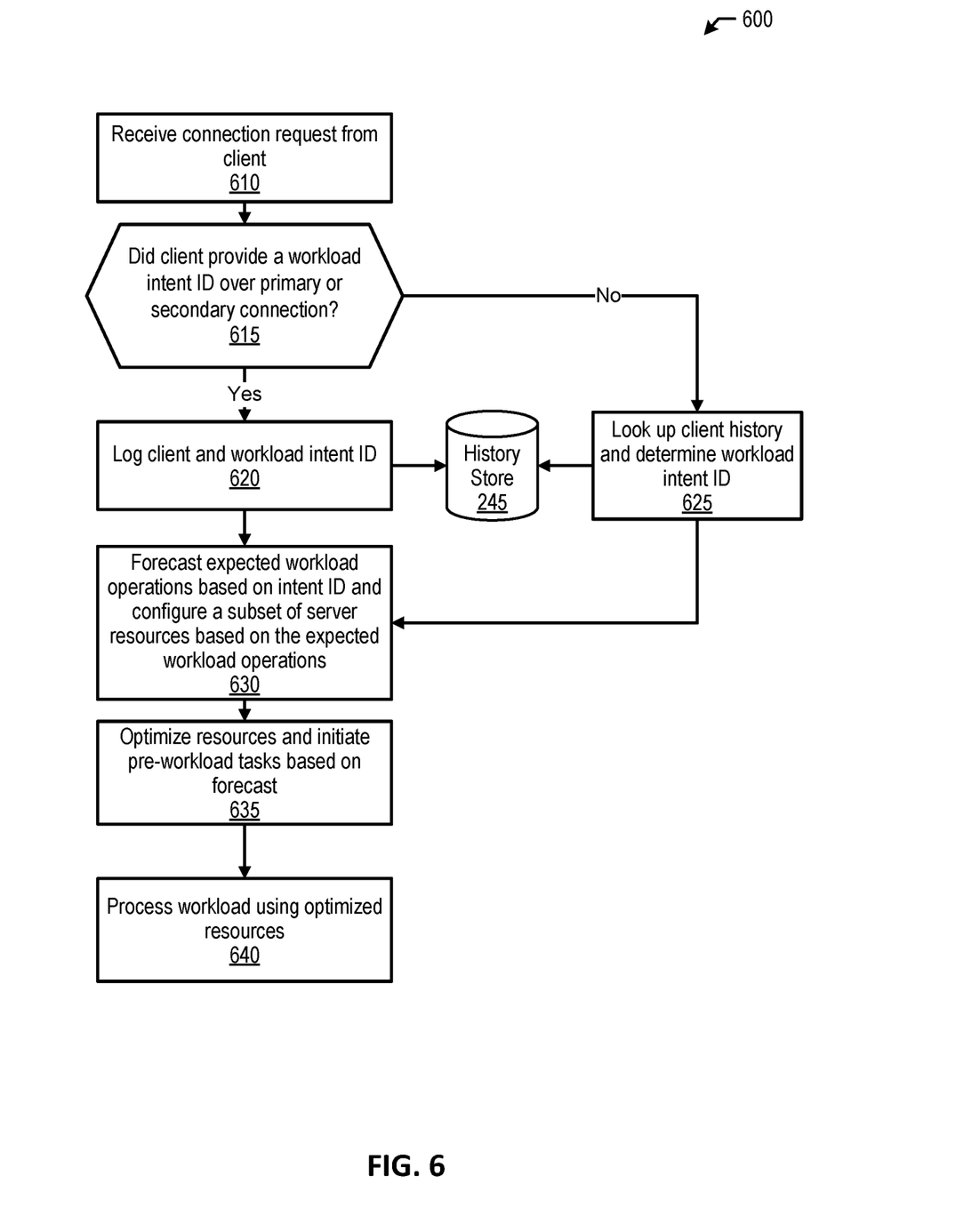
FIG. 6 is a flow diagram illustrating operations of a server forecasting expected workload operations from a client based on a workload intent identifier received from the client and configuring resources based on the expected workload operations according to some embodiments of the present disclosure.

FIG. 6 is a flow diagram illustrating operations of a server forecasting expected workload operations from a client based on a workload intent identifier received from the client and configuring resources based on the expected workload operations according to some embodiments of the present disclosure. Process 600 may be performed by processing logic that includes hardware (e.g. circuitry, dedicated logic, etc.), software (e.g., embodied on a non-transitory computer readable medium), or a combination thereof. For example, process 600 may be performed by storage service engine/logic 106 of FIG. 1.

Referring to FIG. 6, process 600 illustrates example functions used by various embodiments. Although specific function blocks ("blocks") are disclosed in process 600, such blocks are examples. That is, embodiments are well suited to performing various other blocks or variations of the blocks recited in process 600. It is appreciated that the blocks in process 600 may be performed in an order different than presented, and that not all of the blocks in process 600 may be performed.

With reference to FIGS. 6, process 600 begins at block 610, whereupon server processing logic receives a connection request from the client. At block 615, processing logic determines whether the client provided a workload intent identifier over a primary connection or a secondary connection. If the client did not provide a workload intent identifier to the server, block 615 branches to block 625, whereupon processing logic looks up information of past connections with the client in history store 245 and determines a workload intent identifier based on the historical information. On the other hand, if the client provided a workload intent identifier over a primary connection or secondary connection, block 615 branches to block 620, whereupon processing logic logs a client identifier and the workload intent identifier in history store 245.

At block 630, processing logic forecasts expected workload operations or expected protocol operations based on the workload intent identifier, and configures a subset of server resources based on the expected workload operations. At block 635, processing logic optimizes server resources and initiates pre-workload tasks based on the forecasted expected workload operations or expected protocol operations. For example, the server may provide thick provisioning space for all files opened on the connection to reduce fragmentation in the filesystem for a workload that is forecasted to write large, contiguous files. At block 640, processing logic processes workload operations received from the client using the subset of server resources.

Note that some or all of the components as shown and described above (e.g., client 101, client 102, management console server 160, storage system 104, etc. of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
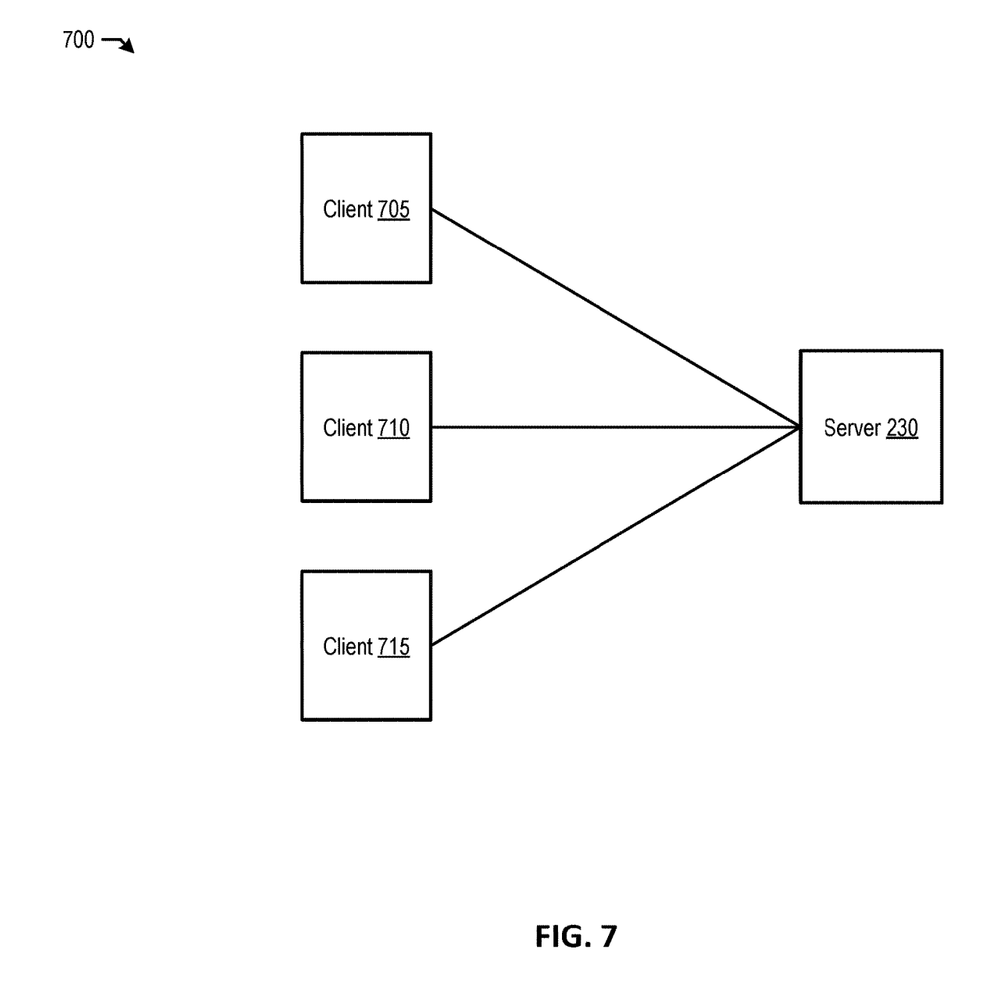
FIG. 7 is a block diagram illustrating multiple concurrent connections, according to some embodiments of the present disclosure.

FIG. 7 is a block diagram illustrating multiple concurrent connections, according to some embodiments of the present disclosure. Diagram 700 shows server 230 concurrently communicating with clients 705, 710, and 715. In some embodiments, each of clients 705, 710, and 715 communicates with a different intent ID and performs separate workloads. As such, each individual connection (or session) is individually optimized for resource reservation by server 230 for quality of service.

Figure 8:
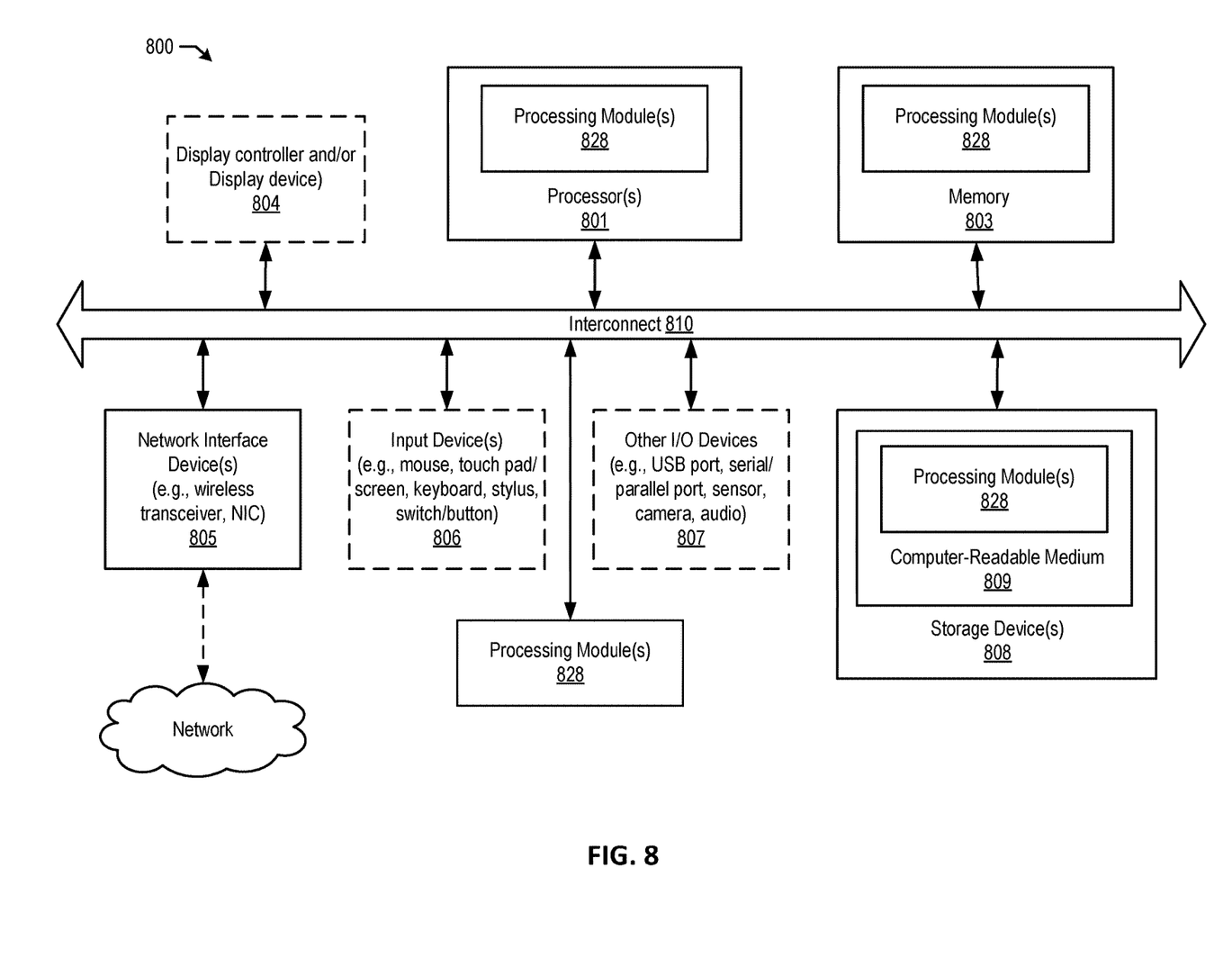
FIG. 8 is a block diagram illustrating a data processing system according to some embodiments.

FIG. 8 is a block diagram illustrating an example of a data processing system which may be used with some embodiments of the present disclosure. For example, system 800 may represents any of data processing systems described above performing any of the processes or methods described above. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 800 is intended to show a high level view of many components of the computer system. However, it is to be understood that additional components may be present in certain implementations and furthermore, different arrangement of the components shown may occur in other implementations. System 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In some embodiments, system 800 includes processor 801, memory 803, and devices 805-808 via a bus or an interconnect 810. Processor 801 may represent a single processor or multiple processors with a single processor core or multiple processor cores included therein. Processor 801 may represent one or more general-purpose processors such as a microprocessor, a central processing unit (CPU), or the like. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 801, which may be a low power multi-core processor socket such as an ultra-low voltage processor, may act as a main processing unit and central hub for communication with the various components of the system. Such processor can be implemented as a system on chip (SoC). Processor 801 is configured to execute instructions for performing the operations and steps discussed herein. System 800 may further include a graphics interface that communicates with an optional graphics subsystem, which may include a display controller, a graphics processor, and/or a display device.

Processor 801 may communicate with memory 803, which in some embodiments can be implemented via multiple memory devices to provide for a given amount of system memory. Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processor 801, or any other device. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OSR/iOS® from Apple, Android® from Google®, Linux, Unix®, or other real-time or embedded operating systems such as VxWorks.

System 800 may further include IO devices such as devices 805-808, including network interface device(s) 805, optional input device(s) 806, and other optional IO device(s) 807. Network interface device 805 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 806 may include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). For example, input device 806 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 807 may include an audio device. An audio device may include a speaker and/or a microphone to facilitate voice-enabled functions, such as voice recognition, voice replication, digital recording, and/or telephony functions. Other IO devices 807 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 801, e.g., via a serial peripheral interface (SPI). This flash device may provide for non-volatile storage of system software, including a basic input/output software (BIOS) as well as other firmware of the system.

Storage device 808 may include computer-accessible storage medium 809 (also known as a machine-readable storage medium or a computer-readable medium) on which is stored one or more sets of instructions or software (e.g., processing module, unit, and/or logic 828) embodying any one or more of the methodologies or functions described herein. Processing module/unit/logic 828 may represent any of the components described above, such as, for example, a storage service logic as described above. Processing module/unit/logic 828 may also reside, completely or at least partially, within memory 803 and/or within processor 801 during execution thereof by data processing system 800, memory 803 and processor 801 also constituting machine-accessible storage media. Processing module/unit/logic 828 may further be transmitted or received over a network via network interface device 805.

Computer-readable storage medium 809 may also be used to store the some software functionalities described above persistently. While computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 828, components and other features described herein can be implemented as discrete hardware components or integrated in the functionality of hardware components such as ASICS, FPGAs, DSPs or similar devices. In addition, processing module/unit/logic 828 can be implemented as firmware or functional circuitry within hardware devices. Further, processing module/unit/logic 828 can be implemented in any combination hardware devices and software components.

Note that while system 800 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the present disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the present disclosure as described herein.

In the foregoing specification, embodiments of the present disclosure have been described with reference to specific exemplary embodiments thereof. It will be evident that various modifications may be made thereto without departing from the broader spirit and scope of the present disclosure as set forth in the following claims. The specification and drawings are, accordingly, to be regarded in an illustrative sense rather than a restrictive sense.

What is claimed is:

1. A computer-implemented method, comprising:
receiving, at a client from an application currently executing on the client, a workload intent identifier corresponding to a workload intent of a forthcoming workload comprising one or more workload operations from the application, wherein the workload intent corresponds to one or more characteristics of the forthcoming workload over a connection between the client and a server, the server being unaware of the workload intent of the forthcoming workload;
sending, by the client, the workload intent identifier to the server, wherein the server is configured to optimize server resources and prepare data to send over the connection to the client based on the workload intent identifier prior to the client sending the one or more workload operations; and
sending, by the client in response to sending the workload intent identifier, the one or more workload operations to the server over the connection that are consistent with the workload intent.

2. The method of claim 1, wherein the connection utilizes a network protocol, the method further comprising:
embedding the workload intent identifier into a network protocol header corresponding to the network protocol; and
sending the workload intent identifier from the client to the server over the connection.

3. The method of claim 1, wherein the workload intent identifier is sent from the client to the server during initial client-server handshaking to establish the connection.

4. The method of claim 1, wherein the connection is a primary connection, the method further comprising:
initiating a secondary connection between the client and the server, wherein the secondary connection operates concurrently with primary connection; and sending the workload intent identifier from the client to the server over the secondary connection.

5. The method of claim 1, further comprising:
determining, by the client, whether the application provided the workload intent identifier; and
responsive to the application providing the workload intent identifier, sending the workload intent identifier provided by the application from the client to the server.

6. The method of claim 1, wherein the server is configured to forecast expected workload operations based on the workload intent identifier and optimize the server resources based on the expected workload operations, and wherein the server optimizes the server resources by identifying a subset of the server resources that correspond to the expected workload operations and uses the subset of the server resources to process the forthcoming workload.

7. A computer-implemented method, comprising:
receiving, by a server, a workload intent identifier from a client that corresponds to a workload intent of a workload comprising one or more workload operations that is forthcoming from an application currently executing on the client, wherein the client receives the workload intent identifier from the application while executing on the client, and the workload intent corresponds to one or more characteristics of the forthcoming workload over a connection between the client and the server, the server being unaware of the workload intent of the forthcoming workload;
configuring server resources, by the server, by identifying a subset of the server resources optimized for the workload intent and preparing data to send over the connection to the client based on the workload intent identifier;
receiving, by the server, the one or more workload operations from the client that are consistent with the workload intent; and
processing, by the server, the one or more workload operations utilizing the subset of the server resources.

8. The method of claim 7, wherein the configuring further comprises:
forecasting, by the server, expected protocol operations forthcoming from the client based on the workload intent identifier; and
identifying the subset of the server resources based on the expected protocol operations.

9. The method of claim 7, wherein the connection utilizes a network protocol, the method further comprising:
receiving the workload intent identifier from the client at the server over the connection, wherein the workload intent identifier is embedded in a header of the network protocol.

10. The method of claim 7, wherein the connection is a primary connection, the method further comprising:
initiating a secondary connection between the client and the server, wherein the secondary connection is open concurrently with primary connection; and
receiving the workload intent identifier from the client at the server over the secondary connection.

11. The method of claim 7, wherein the workload intent identifier is received from the client at the server during initial client-server handshaking to establish the connection.

12. The method of claim 7, further comprising:
determining, by the server, a subsequent workload intent for a subsequent connection based on historical connections between the server and the client;
configuring filesystem and input/output (I/O) capabilities of the server based on the subsequent workload intent and identifying a subsequent subset of the server resources optimized for expected workload operations forecasted by the server; and
processing, by the server, the one or more workload operations utilizing the subsequent subset of the server resources.

13. A system comprising:
a processing device; and
a memory to store instructions that, when executed by the processing device cause the processing device to:
receive, at a client from an application currently executing on the client, a workload intent identifier corresponding to a workload intent of a forthcoming workload from the application, wherein the workload intent corresponds to one or more characteristics of the forthcoming workload over a connection between the client and a server, the server being unaware of the workload intent of the forthcoming workload;
send, by the client, the workload intent identifier to the server, wherein the server is configured to optimize server resources and prepare data to send over the connection to the client based on the workload intent identifier prior to the client sending the one or more workload operations; and
send, by the client in response to sending the workload intent identifier, the one or more workload operations to the server over the connection that are consistent with the workload intent.

14. The system of claim 13, wherein the connection utilizes a network protocol, and wherein the processing device, responsive to executing the instructions, further causes the system to:
embed the workload intent identifier into a network protocol header corresponding to the network protocol; and
send the workload intent identifier from the client to the server over the connection.

15. The system of claim 13, wherein the workload intent identifier is sent from the client to the server during initial client-server handshaking to establish the connection.

16. The system of claim 13, wherein the connection is a primary connection, and wherein the processing device, responsive to executing the instructions, further causes the system to:
initiate a secondary connection between the client and the server, wherein the secondary connection operates concurrently with primary connection; and
send the workload intent identifier from the client to the server over the secondary connection.

17. The system of claim 13, wherein the processing device, responsive to executing the instructions, further causes the system to:
determine, by the client, whether the application provided the workload intent identifier;
responsive to the application providing the workload intent identifier, send the workload intent identifier provided by the application from the client to the server; and
responsive to the application omitting the workload intent identifier, determine the workload intent identifier of the forthcoming workload based on one or more historical log entries.

18. The system of claim 13, wherein the server is configured to forecast expected workload operations based on the workload intent identifier and optimize the server resources based on the expected workload operations, and wherein the server optimizes the server resources by identifying a subset of the server resources that correspond to the expected workload operations and uses the subset of the server resources to process the forthcoming workload.

* * * * *